June 10, 1958 — G. CUSANZA — 2,838,078
GAUGE FOR CUT-OFF SAWS AND DADOS
Filed Sept. 17, 1956 — 3 Sheets-Sheet 1

INVENTOR.
GEORGE CUSANZA
BY Lothrop & West
ATTORNEYS

June 10, 1958 — G. CUSANZA — 2,838,078
GAUGE FOR CUT-OFF SAWS AND DADOS
Filed Sept. 17, 1956 — 3 Sheets-Sheet 2
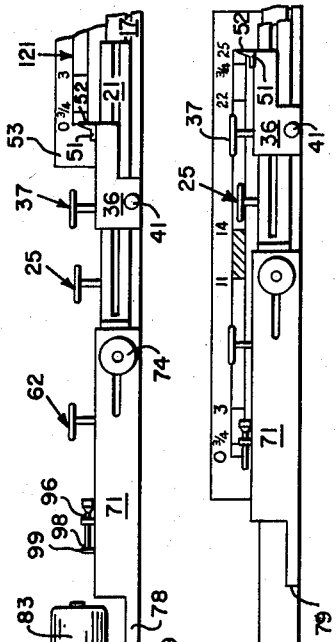
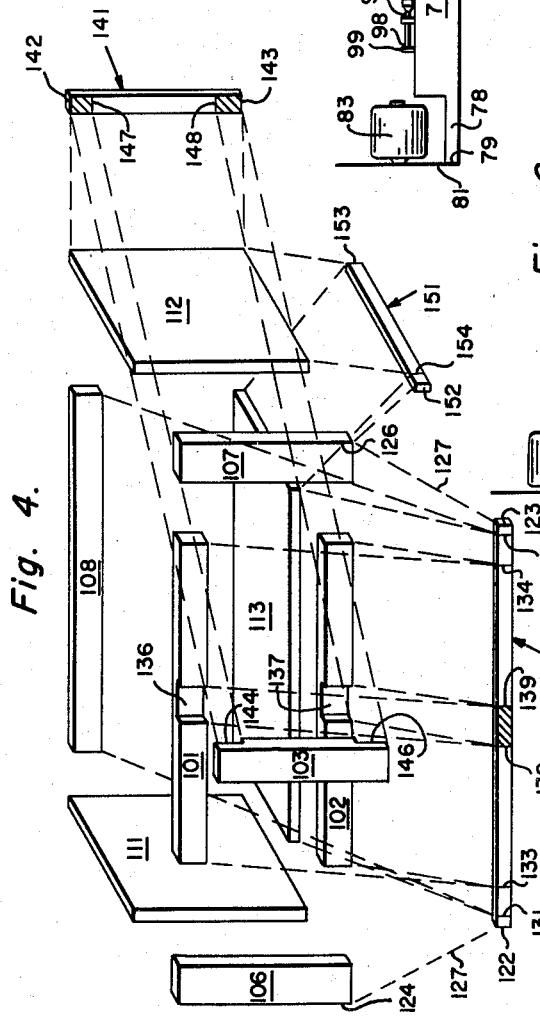
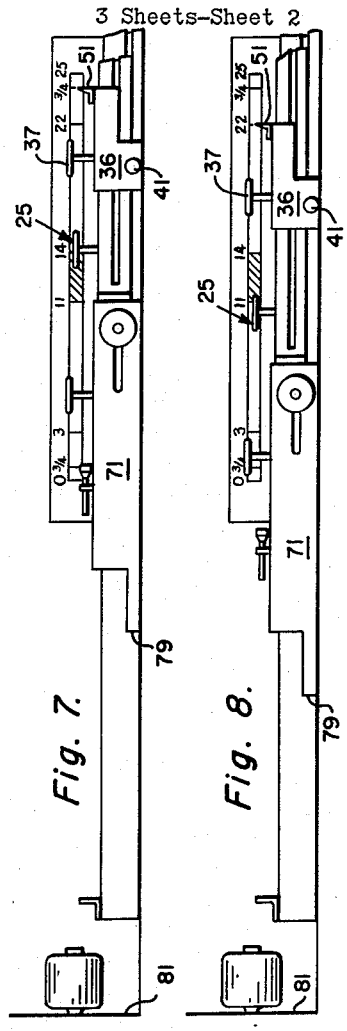
INVENTOR.
GEORGE CUSANZA
BY Lothrop & West
ATTORNEYS June 10, 1958　　　　G. CUSANZA　　　　2,838,078
GAUGE FOR CUT-OFF SAWS AND DADOS
Filed Sept. 17, 1956　　　　　　　　　　　　3 Sheets-Sheet 3
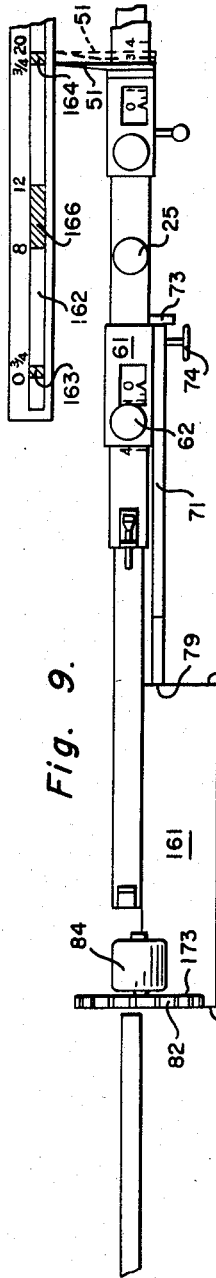
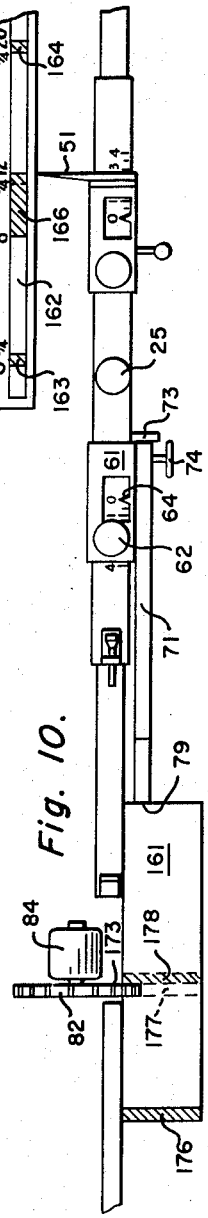
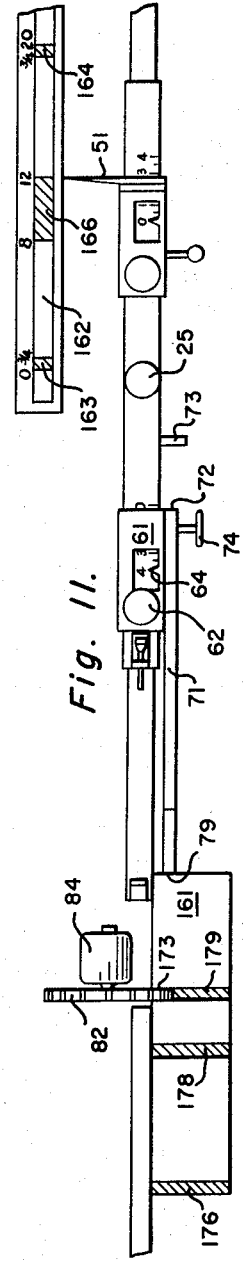
INVENTOR.
GEORGE CUSANZA
BY
*Lothrop & West*
ATTORNEYS

United States Patent Office
2,838,078
Patented June 10, 1958

2,838,078
GAUGE FOR CUT-OFF SAWS AND DADOS
George Cusanza, Sacramento, Calif.

Application September 17, 1956, Serial No. 610,122

5 Claims. (Cl. 143—174)

The invention relates to improvements in gauges for cutting and dadoing wood or other material, and, more particularly, to gauges for use in the production of wooden or other components of cabinets and related structures.

It is an object of the invention to provide a highly versatile gauge which is capable of producing cabinet components at a cost far below that presently encountered with the type of mill equipment and techniques used.

It is another object of the invention to provide a gauge which not only saves time but which can, after a relatively short training period, be operated by a comparative novice in the woodworking art.

It is yet another object of the invention to provide a gauge whose operation is substantially foolproof and which, as a consequence, eliminates wastage of valuable wood through operators' errors.

It is still another object of the invention to provide a gauge which, while finding greatest utility in large scale or mill type of operation, can with equal ease be utilized by small scale operators and even by individuals such as home workshop enthusiasts.

It is a further object of the invention to provide a gauge which is relatively inexpensive to manufacture and which is therefore within the financial reach of all potential users.

It is a still further object of the invention to provide a gauge which is efficient in layout and which is thus not unduly demanding of floor space and which, furthermore, can easily be fitted into the space and manner of operation of the customary mill, cabinet shop or home workshop.

It is yet a further object of the invention to provide a gauge which enables the user to cut, dado and otherwise convert wood stock with a high degree of dimensional accuracy and reproducibility.

It is another object of the invention to provide a generally improved woodworking gauge.

Other objects, together with the foregoing, are attained in the embodiment described below and shown in the accompanying drawings in which:

Figure 4 is an exploded view of the cabinet framework shown in Figure 3 with corresponding templates for width, height and depth dimensions of the framework members.

Figure 5 is a side elevation showing the gauge in base or zero location, a portion of the figure being broken away to reduce its extent.

Figure 6 is a view comparable to Figure 5 but with the gauge components positioned for a cut of twenty-five inch length.

Figure 7 is a view comparable to Figure 6 but with the gauge components in a somewhat differing position.

Figure 8 shows the gauge components in still another location.

Figure 9 is a plan of the gauge with an end dado cut being made, the template being turned on its side more clearly to show the indicia thereon.

Figure 10 is comparable to Figure 9 but with the components shown in a location for a first central dado cut.

Figure 11 illustrates the components in position for a second central dado cut.

Figure 1:
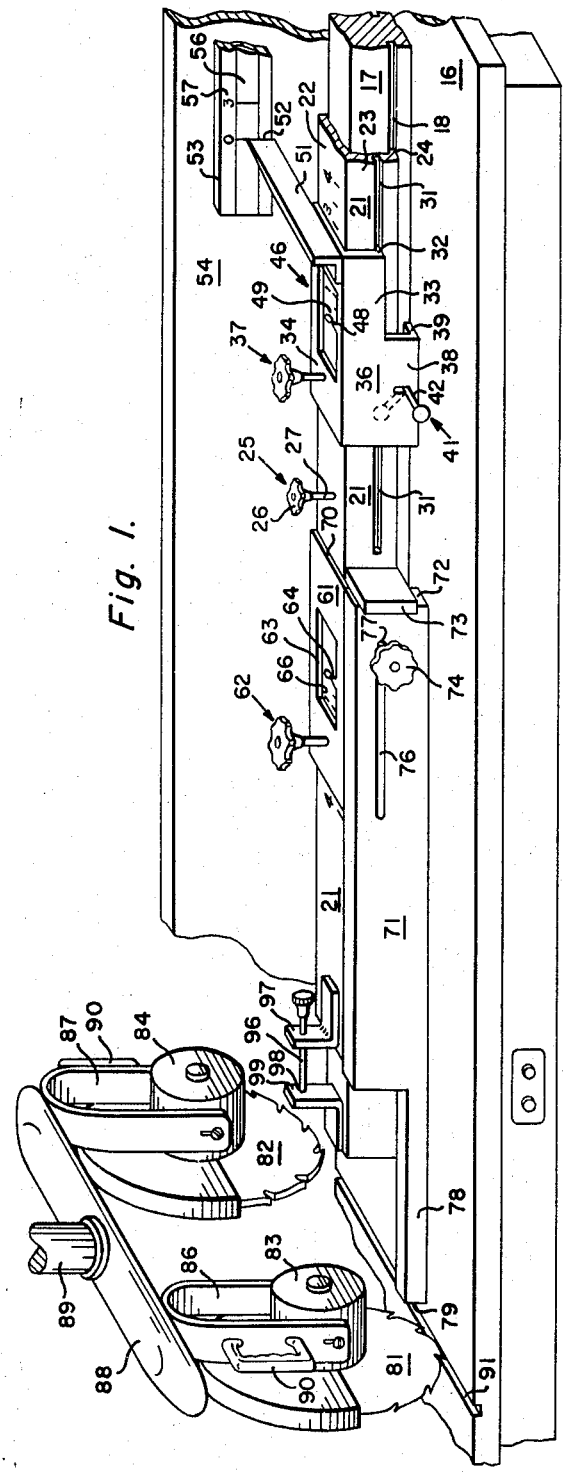
Figure 1 is a perspective of the gauge mounted on a bench and showing a transversely movable cut-off saw and dado, a portion of the figure being broken away to reduce its extent.

While the gauge of my invention is susceptible of numerous physical embodiments depending on the particular uses to be expected and environments to be encountered, a considerable number of the herein shown and described devices have been made and used and have proven to be eminently satisfactory in all respects.

Mounted securely on the top surface of a bench 16, or table, is an elongated rail 17, conveniently square in section, and indented on opposite sides by a pair of guide slots 18 running longitudinally in the rail.

Slidably mounted on the rail 17 is an elongated sleeve 21 including a top plate 22 and a pair of depending side plates 23 inturned at the bottom to form a pair of flanges 24 disposed in the rail slots 18 and serving to prevent vertical separation of sleeve and rail while allowing free relative longitudinal movement therebetween. Clamping between the rail 17 and the sleeve 21 is effected by screwing downwardly on a clamp 25 which includes a handwheel 26 secured to a threaded stem 27 in engagement with a threaded hub 28 provided in the sleeve, a foot piece 29 exerting clamping effort against the rail.

A pair of longitudinal slots 31 on opposite sides of the sleeve 21, throughout most of the sleeve's length, accommodates a pair of inturned flanges 32 located part way down a pair of side plates 33 depending from a top plate 34, the assemblage being termed a carriage 36. The carriage 36 is slidable with respect to the sleeve 21 but is also capable of being clamped thereto owing to the provision of a carriage-to-sleeve clamp 37 similar in construction to the sleeve clamp 25 previously described. The carriage 36 is also clampable to the rail 17 independently of the effect of the carriage-to-sleeve clamp 37. In other words, the carriage 36 can, when required, be clamped to the rail 17 while the sleeve is still free to be moved longitudinally. A skirt or depending portion 38 of each of the carriage side plates includes an inturned flange 39 bearing against the adjacent side of the rail. A quick acting clamp 41, of conventional cam type, clamps the carriage 36 to the rail 17 by movement of a lever arm 42 from a first position, shown in full line, to a second position, shown in dotted lines in Figure 1, the clamp urging the flange 39 on the far side of the carriage into tight contact with the adjacent rail portion.

With the carriage 36 clamped to the rail but with the sleeve 21 free to move, the operator can slide the sleeve relative to the carriage and can offset the carriage from the sleeve by a predetermined amount ascertainable by reference to an indexing mechanism 46 comprising an aperture 47 in the carriage top plate 34, the plate 34 being provided with an inwardly extending index arrow 48. A plurality of indicia 49 such as scribe marks and figures in inches on top of the sleeve and appearing in the aperture below the arrow 48 denotes the extent of displacement of the carriage with respect to the sleeve from a zero or base position, such base position being indicated by a zero figure, as appears in Figure 1 at pointer 64.

Mounted on the carriage and extending rearwardly in transverse fashion is a pointer arm 51 terminating in a knife-edge 52 located adjacent a longitudinally disposed template holder 53 mounted, for example, on a back wall 54 of the bench 16. Demountably situated in the template holder 53 is a template 56 provided with a plurality of indicia 57 located in predetermined positions corresponding to the dimensions to which the various structural members are to be cut.

Adjacent the left-hand end of the sleeve, as appears most clearly in Figure 1 is a carriage 61, comparable in many respects to the carriage 36, including a carriage-to-sleeve clamp 62, a window 63 and an index arrow 64 pointing toward indicia 66 such as scribe marks and figures in inches, and indicating the extent of displacement from a base position as between the carriage 61 and the sleeve 21.

Located on the front side of the sleeve as appears in Figure 1 and slidably mounted thereon is a spacer arm 71 whose right hand end 72 is normally co-planar with the adjacent end 70 of the carriage 61, a stop block 73 mounted on the sleeve serving to limit motion of the spacer arm in a right-hand direction. A spacer clamp 74 locks the arm to the sleeve in any desired position, a slot 76 in the arm accommodating the stem 77 of the clamp which threads into the sleeve behind the arm. Extending from the arm longitudinally in a left-hand direction is a finger 78 terminating in a point 79, or tip.

When the gauge elements are all in zero or basic position, the point 79 is in light contact with the adjacent face of a saw blade 81, or a dado blade set-up 82. The saw and the dado are mounted in substantially co-planar relation and are rotated by conventional electric motors 83 and 84, respectively, mounted in corresponding yokes 86 and 87 permitting of vertical adjustment of the motor and blade heights. The yokes, in turn, depend from a transverse beam 88 mounted on a vertical member 89 suspended from suitable structure (not shown) enabling the saw and dado mechanism to be pulled and pushed across the bench in a transverse direction, the operator grasping a handle 90 to effect the motion. The bottom of the saw blade 81 is usually partially located in a transverse slot 91 in the bench so as to effect a full cutting of any material, such as wood, to be cut to length. The dado blade 82, on the other hand, is adjusted so that its lowest point of arc is at the height required for the dado cuts. It has been found that by swinging the beam 88 around the vertical member 89 as a pivot and by incorporating a pair of self-indexing devices (not shown) 180° apart that either the saw or dado can quickly be rotated to front position.

In order to bring the gauge elements into zero or basic position the saw blade 81 is pulled outwardly until the point 79 of the finger 78 is in abutment with the adjacent face of the blade. The sleeve 21 is thereupon moved longitudinally until the end 72 of the spacer arm 71 abuts the limit stop block 73. An adjusting screw 96 threadedly mounted in a bracket 97 on the sleeve is thereupon rotated until the screw tip 98 lightly touches a base or bench mark bracket 99 on the rail.

Figure 3:
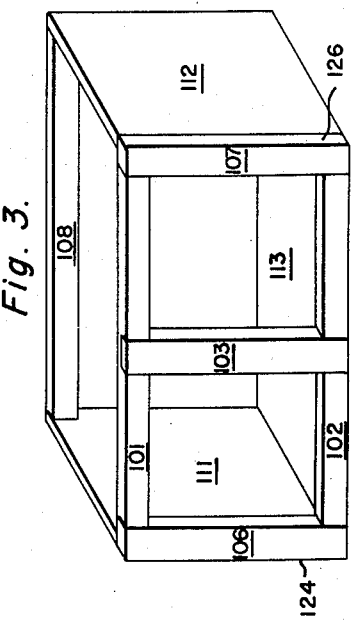
Figure 3 is a perspective of a simple cabinet framework, assembled.
Figure 2:
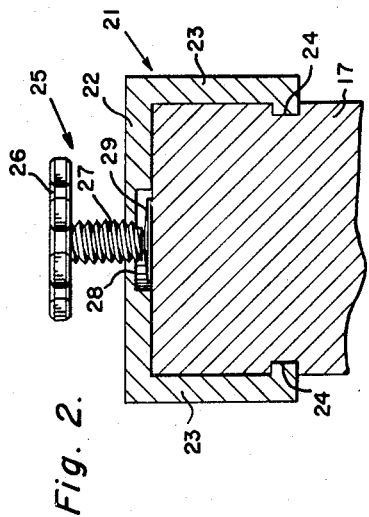
Figure 2 is a section of a locking clamp.

With the gauge in basic position, and the appropriate template or templates located in the template holder, the operator can proceed with the fabrication of the parts required to construct, for example, the simple cabinet structure shown in Figure 3.

It is clearly to be understood that the gauge of my invention is highly versatile and is capable of performing not only with respect to elementary structures of the type shown but also in the manufacture of extremely complex ones. Furthermore, the operations now to be described are only representative of the innumerable ones possible. The more familiar an operator becomes with the machine, the greater the machine's capabilities appear. It is believed, however, that a description of a simple structure and associated group of operations will suffice to afford the person skilled in the art an appreciation and knowledge of the flexibility and adaptability of the device.

The cabinet structure shown in Figure 3, and in exploded fashion in Figure 4, comprises a top rail 101, a bottom rail 102, and a vertical muntin 103 mortised into the top and bottom rails. Mounted on the ends of the rails 101 and 102 is a pair of stiles 106 and 107. A back rail 108 spans the upper rear portions of a pair of side panels 111 and 112, while a bottom panel 113 serves as a flooring for the structure. For purposes of simplicity it will be assumed that all pieces are cut from stock having a thickness of three quarters of an inch.

As can be seen by reference to Figures 3 and 4, all of the structural components of the cabinet are susceptible of being classified into length, height and width members. Thus, the horizontal members 101, 102, 108 and 113 can be considered as length members and their dimensions, accordingly, are represented on a length template 121.

The length template 121 comprises a piece of suitable material such as wood, metal or a strip of strong paper approximately marked to indicate all length dimensions As appears most clearly in Figure 4, the distance between the left-hand end 122 and the right-hand end 123 of the length template 121 corresponds to the over-all length of the assembled cabinet, that is to say, the distance between the left-hand front corner 124 of the stile 106 and the right-hand front corner 126 of the stile 107. Dotted lines 127 and 128, respectively, indicate the correspondence between template and over-all finished cabinet dimensions. In similar fashion, the other dotted lines indicate corresponding dimensions between templates and structural configurations. Thus, the lengths of the back rail 108 and bottom panel 113 are indicated by the distance between the marks 131 and 132 on the length template; the lengths of the top rail 101 and bottom rail 102 are represented by the scribes 133 and 134; and the length of the two rabbets or dadoed portions 136 and 137, respectively, in the top and bottom rails, are shown by the marks 138 and 139.

In comparable fashion, a height template 141 provides all necessary information to the operator concerning the height members 103, 106, 107, 111 and 112. In the cabinet structure illustrated, all of the said height members are of the same height, namely, the distance between the upper end 142 and the lower end 143 of the template 141. The upper dadoed portion 144 and lower dadoed portion 146 of the muntin 103 are represented by the corresponding upper line 147 and lower line 148 on the height template 141.

A depth template 151 is also provided, although in the simple cabinet structure illustrated there is no real necessity for cutting any of the members to predetermined depth dimensions. The over-all depth of the completed structure is represented, however, by the distance between the front end 152 and the rear end 153 of the template; and the depth of both the bottom panel 113 and the end walls 111 and 112 are shown on the depth template 151, and corresponds to the distance between the rear end 153 and an intermediate scribe mark 154. Were the panel 113 and end walls 111 and 112 cut from a large slab or sheet of material, the depth dimension indicated by the marks 153 and 154 would be utilized; but, ordinarily, the pieces 111, 112 and 113 would all be cut from a long board previously sized to a width equal to the distance between marks 153 and 154, and thus only the length template (for cutting the bottom panel 113) and the height template (for cutting the end walls 111 and 112) would be utilized. In most structures, however, depth cuts are required and for such structures a depth template would be used.

The templates would ordinarily be prepared by a person skilled in the art of analyzing structures and by one capable of recognizing how a minimum of cuts can be effected by proper template layout.

After the templates are prepared, each is appropriately labeled, as by a designation such as "Length Template," "Height Template" and "Depth Template," in order to prevent inadvertent use of one for the other.

Having inserted a template, for example, the length template 121 in its holder 53, the operator proceeds as follows. The carriages 36 and 61 are located on the sleeve 21 so that the index arrows 48 and 64 are opposite the zero figures scribed on the sleeve. The carriages are thereupon locked to the sleeve by turning the handles of the clamps 37 and 62. Next, the spacer arm 71 is slid toward the right in Figures 1 and 5 through 11 until it abuts the limit stop block 73 and the arm is locked to the sleeve by the clamp 74. Then the sleeve 21, with the foregoing appendages locked to it, is translated along the rail 17 in a left-hand direction until the tip 79 of the finger 78 comes into abutment with the adjacent face of the saw blade 81, the saw having been pulled outwardly across the bench so that abutment will occur. Adjustment of the zero adjusting screw 96 is sometimes necessary so that contact of the screw tip 98 against the rail bracket 99 occurs simultaneously with contact between the finger point 79 and the saw blade 81. When adjustment is completed, a final check is made to see that the knife-edge 52 of the pointer 51 on the carriage 36 is located at the zero scribe mark on the template. At times, longitudinal relocation of the template may be required so as to bring the knife-edge and the zero mark into coincidence.

Having brought the entire machine into its bench mark or basic position, cutting of the structural members can be commenced.

Assuming that the length template 121 is first being utilized, and that the over-all dimension in length equals twenty-five inches it can be seen by especial reference to Figures 6–8, that the mounted length template 121 provides the operator with a very clear visualization of the various parts to be cut. This pictorial illustration provided by the template serves to avoid confusion and faulty cuts and is one of the several unique aspects of the gauge which distinguishes it from prior devices of this general nature.

As can be seen by especial reference to Figure 6, when the sleeve 21 and its attendant parts are slid in a right-hand direction along the rail until the knife-edge 52 of the pointer 51 coincides with the end of the template, denoted by the indicium "25" (inches), the distance between the tip 79 of the spacer arm 71 and the adjacent face of the saw 81 is exactly twenty-five inches. Thus, if a board of random length, but in excess of twenty-five inches, were slid from a location to the left of the saw and translated in a right-hand direction into abutment with the finger tip 79, and the rotating saw blade drawn transversely across the bench, a piece of board exactly twenty-five inches long would be cut.

None of the pieces of the cabinet structure shown, however, is a full twenty-five inches in length. The longest pieces are the back rail 108 and the bottom panel 113, both of which are shorter than twenty-five inches by the thickness of the two end panels 111 and 112, each being three-quarters of an inch thick.

In order to compensate for the thickness of the two end panels it is only necessary for the operator to loosen the clamp 37, slide the carriage 36 toward the right until the index arrow 48 is in register with the one of the indicia 49 corresponding to three-quarters of an inch, re-clamp the clamp 37, and slide the sleeve toward the left until the pointer 51 coincides with the "¾" indicium just to the left of the "25" mark, and as appears most clearly in Figure 7. At this juncture, a board pushed into abutment with the finger point 79 and sawed by a transverse pull of the saw blade 81 will be cut to the exact proper length for either a back rail 108 or bottom panel 113, depending on the width of the stock being used. The reason why the foregoing operations serve to compensate for the two end panel thicknesses is as follows. As the carriage 36 is shifted three-quarters of an inch to the right with respect to the sleeve, then clamped to the sleeve, it is necessary to slide the sleeve and its appendages twice three-quarters (or one and one-half) inches to the left in order to bring the pointer 51 into coincidence with the "¾" indicium as shown in Figure 7. By moving the sleeve one and one-half inches to the left, the finger tip 79 is correspondingly moved one and one-half inches toward the left, thus decreasing the distance between the tip 79 and the cut-off saw 81 by the same amount.

With the set-up established as heretofore described, and as shown in Figure 7, the rail clamp 25 is placed in operation, securely clamping the sleeve (and thus the spacer arm 71 and finger tip 79) in the position shown. As double protection, the lever 41 would also be clamped so as to lock the carriage 36 to the rail. The operator can then proceed to cut off as many back rails 108 or bottom panels 113 as are required merely by consecutively sliding the appropriate width of stock into abutment with the tip 79 and pulling the saw across the bench to effect cutting off of the pieces in series.

Having cut a sufficient number of back rails and bottom panels, the operator is next able to proceed with the cutting off of the top rails 101 and bottom rails 102 in the quantities desired. The first step would be to loosen the carriage 36 from the sleeve and the rail by loosening the clamps 37 and 41. He would thereupon slide the carriage 36 toward the right until the index arrow 48 coincides with the inch scale indicium equal to the width of the stile 106, in this case three inches. The clamps 37 and 41 are then locked, and the sleeve and its associated members are moved toward the left until the pointer 51 coincides with the figure "22" (inches) as shown in Figure 8 which is equal to the distance between the left hand front corner 124 of the stile 106 and the right hand end of the top rail 101 and bottom rail 102. By having offset the carriage a distance of three inches the width of the stile 106 is taken into account and thus the distance between the finger tip 79 and the saw blade 81 is exactly equal to the desired length of the rails 101 and 102. The rail clamp 25 is then used to clamp the sleeve securely to the rail and the necessary quantity of rails 101 and 102 can be produced.

In comparable fashion and by use of the appropriate template and carriage setting, all of the members of the structure can quickly and easily be made.

In the event the operator fails to cut a sufficient number of, say rails 101 or 102, and has proceeded to another template set-up, it is but a simple matter to run off some more rails merely by off-setting the carriage by three inches and moving the pointer to the "22" (inch) mark. The conditions, in other words, are highly reproducible, and the parts so produced are thoroughly compatible with previous runs.

Assuming now that the desired parts have been cut off, it becomes necessary to rabbet or rout out or dado out the end portions 144 and 146 in the muntin 103 and the central portions 136 and 137 in the rails 101 and 102, respectively.

In order to show how dadoing would be performed not only on an end, but also in a central location, an entirely separate piece of previously cut to length material, designated by the numeral 161, as shown, the operations being shown in Figures 9–11. Correspondingly, a separate template 162 is utilized. The template 162 indicates that the full length of the board 161 is twenty inches, that a dado of three-quarters thickness is to be cut out at each end, over the shaded portions 163 and 164 and that a dado four inches wide is to be cut out of the central portion indicated by the shaded area 166.

While practice and skill will suggest uses of the off-setting feature of the cut-off carriage 36 even in the dadoing operations, for purposes of simplicity it will be assumed that the cut-off carriage 36 is kept at zero off-set during the dadoing steps, and only the dado carriage 61 and its attendant structure, including the spacer arm 71, will be off-set.

The first step in the dadoing operation shown is to slide the sleeve to the right until the pointer 51 is in register with the template mark "20." The right hand end 171 of the board 161 is then abutted against the finger tip 79 and the dado blade pulled across the bench. If the set-up is proper the left hand end 172 of the board 161 should be in light contact with the adjacent face 173 of the dado blade 82. The dado is then pushed backwardly out of the way and the operation can proceed.

As shown most clearly in Figure 9, the pointer is moved to the left (by sliding the sleeve to the left) to the position shown in full line, with the pointer in registry with the "¾" mark. It is assumed both that the dado blade is three-quarters of an inch wide and that the full dado cut is to be the same width. The sleeve is thereupon locked to the rail by means of the clamp 25 and the dado blade swung across the bench so as to cut out the portion indicated by the shaded area 176. Numerous boards can then be cut in similar fashion before the next set-up is made.

The succeeding step is to loosen the rail clamp 25 and slide the sleeve toward the left until the pointer 51 reaches the numeral or mark "12" inches, as appears in Figure 10.

Since the distance between the finger tip 79 and the adjacent face 173 of the dado equals the distance between the "0" template mark and the mark at which the pointer 51 is located, and vice versa, it can be seen that if a dado cut were to be made across the outline area 177 as shown in Figure 10 the cut would be outside the desired area to be cut as indicated by the shaded portion 166 on the template. Instead, the cut should be made as shown by the shaded area 178. The proper cut can be effected either by moving the sleeve to the left until the pointer 51 coincides with the "¾" (inch) mark adjacent the "12" (inch) mark, or by off-setting the dado carriage 61 and spacer arm to the left until the index arrow covers a "¾" (inch) mark scribed on the underlying sleeve. This latter procedure, of course, moves the finger tip 79 and the board 161 to the left by the proper amount, namely three-quarters of an inch.

After the desired number of boards have had the dado strip portion 178 cut out, it has been found that maximum production is obtained not by successively moving the sleeve toward the left in set-up intervals of three-quarters of an inch and cutting all of the boards with each set-up. Instead, it has been found that it is much faster if the proper cut 179 at the other end of the central cut-out portion is next made. Then, for each board it is merely necessary to loosen the sleeve on the rail and push the dado back and forth across the board two or three times, each time sliding the board a fraction of an inch and successively or incrementally routing out the entire central area to be removed. Thus, after the first strip 178 is removed, the opposite border strip 179 can quickly be rabbeted out by loosening the clamps 62 and 74 and sliding the carriage 61 and spacer arm 71 toward the left until the index arrow 64 approaches and covers the mark "4" as shown in Figure 11. The clamp 62 and the clamp 74 are thereupon tightened and the cut 179 made. Next, the clamp 74 is loosened and the board is pushed toward the right, stopping at intervals of one-half inch or so for the succeeding dado cut to be made. Ordinarily the operator will stop further cutting as soon as the cut out strip 179 is reached. If he inadvertently continues, however, abutment of the right end 72 of the spacer arm against the limit stop block 73 prevents excessive cutting.

It can therefore be seen that the woodworking gauge of my invention not only provides a highly flexible and versatile machine whose potential in the hands of a person skilled in the art is unlimited, but it also furnishes a highly useful accessory to even a beginning or only partly skilled artisan and handicrafter; thus, while its major utility resides in its use in a mill or large shop, it can, with minor modifications, be of great help to smaller establishments and to home workshops.

What is claimed is:

1. A woodworking gauge comprising a longitudinal rail, a sleeve slidably mounted on said rail, means for locking said sleeve to said rail, a carriage slidably mounted on said sleeve, means for locking said carriage to said sleeve, a pointer transversely mounted on said carriage, a template mounted parallel to said rail, said template being normal to said pointer and adjacent the tip thereof a spacer arm mounted on said sleeve and projectable beyond one end of said rail in one extreme location of said sleeve on said rail, means for locating said sleeve with respect to said rail in said one extreme location whereby the free end of said spacer arm is in contact with the adjacent face of a transversely movable saw blade, and means for locating said carriage and said sleeve in a predetermined location ascertainable by the juxtaposition of said pointer and a predetermined location on said template.

2. A woodworking gauge comprising a longitudinal rail, a sleeve slidably mounted on said rail, means for locking said sleeve at predetermined locations on said rail, a first carriage slidably mounted on said sleeve, means for locking said first carriage to said sleeve, a pointer mounted transversely on said first carriage, a template strip mounted normal and adjacent to said pointer and parallel with said sleeve, a second carriage slidably mounted on said sleeve, means for locking said second carriage to said sleeve, a spacer arm mounted on said second carriage, and a plurality of indicia on said sleeve and on said template strip whereby said pointed and said spacer are located in predetermined positions with respect to a transversely movable saw and dado mounted adjacent one end of said rail.

3. In a gauge for cut-off saws and dados comprising an elongated table, a rail mounted longitudinally on said table, a sleeve lockably mounted on said rail, and a carriage lockably mounted on said sleeve, the combination of a template mounted parallel to said rail, a pointer mounted on said carriage and pointed toward said template, a spacer arm lockably mounted on said sleeve, said arm being in abutment with a saw in one extreme position, and a plurality of indicia on said template whereby said pointer, said carriage and said arm are located in a predetermined position relative to a saw by locating said pointer adjacent a predetermined one of said indicia.

4. The device of claim 3 further characterized by a plurality of indicia on said sleeve, and pointer means on said carriage for off-setting said carriage from a zero position on said sleeve.

5. The device of claim 3 further characterized by a saw and a dado mounting arm disposed above said table, said saw depending from one end of said arm and said dado depending from the other end thereof, said saw and said dado being independently vertically adjustable, and means for orienting said arm in zero and in 180° relation to said table.

References Cited in the file of this patent

UNITED STATES PATENTS

| | | |
|---|---|---|
| 374,730 | Bullis | Dec. 13, 1887 |
| 506,945 | Saunders | Oct. 17, 1893 |
| 536,651 | Potter | Apr. 2, 1895 |
| 849,389 | Hayden | Apr. 9, 1907 |
| 2,485,274 | Garrett | Oct. 18, 1949 |
| 2,526,626 | Basso | Oct. 24, 1950 |
| 2,618,300 | Freudenthaler | Nov. 18, 1952 |
| 2,731,989 | Valcourt et al. | Jan. 24, 1956 |